(12) United States Patent  
Suzuki et al.

(10) Patent No.: US 7,120,394 B2
(45) Date of Patent: Oct. 10, 2006

(54) FRONT-END MODULE AND COMMUNICATION TERMINAL

(75) Inventors: Yoshihiro Suzuki, Tokyo (JP); Atsushi Ajioka, Tokyo (JP); Masashi Katsumata, Tokyo (JP)

(73) Assignee: TDK Corporation, Tokyo (JP)

( * ) Notice: Subject to any disclaimer, the term of this patent is extended or adjusted under 35 U.S.C. 154(b) by 549 days.

(21) Appl. No.: 10/702,645

(22) Filed: Nov. 7, 2003

(65) Prior Publication Data
US 2004/0152426 A1 Aug. 5, 2004

(30) Foreign Application Priority Data
Nov. 8, 2002 (JP) .............................. 2002-325664
Oct. 3, 2003 (JP) .............................. 2003-345605

(51) Int. Cl.
*H04B 1/44* (2006.01)

(52) U.S. Cl. ..................... 455/83; 455/78; 455/188.1; 455/272

(58) Field of Classification Search ................ 455/83, 455/78, 188.1, 272, 307, 339, 127, 323
See application file for complete search history.

(56) References Cited

U.S. PATENT DOCUMENTS

2002/0019218 A1* 2/2002 Greverie et al. ............ 455/127

2003/0092416 A1* 5/2003 Tanaka et al. .............. 455/323
2004/0266378 A1* 12/2004 Fukamachi et al. ...... 455/188.1

FOREIGN PATENT DOCUMENTS

JP 2001-86026 3/2001

* cited by examiner

*Primary Examiner*—Matthew D. Anderson
*Assistant Examiner*—Sanh Phu
(74) *Attorney, Agent, or Firm*—Oblon, Spivak, McClelland, Maier & Neustadt, P.C.

(57) ABSTRACT

A small-sized, front-end module is offered which is for use in a wireless communication device such as a mobile phone and which can suppress harmonics to a sufficiently low level. The front-end module has at least a switching circuit for switching one antenna between a transmiting system and a receiving system, a power amplifier for power-amplifying a transmission signal, and a low-pass filter inserted between the switching circuit and power amplifier. These components are integrated. A first kind of harmonics is produced from the switching circuit toward the power amplifier and reflected by the low-pass filter. A second kind of harmonics is produced from the power amplifier toward the antenna. A third kind of harmonics is produced from the switching circuit toward the antenna. The third kind of harmonics is canceled by the reflected first kind of harmonics and the second kind of harmonics.

10 Claims, 9 Drawing Sheets

FRONT-END MODULE AND COMMUNICATION TERMINAL

BACKGROUND OF THE INVENTION

The present invention relates to the front-end module of a wireless communication device using a send-receive shared antenna and, more particularly, to a front-end module that can be used in a wireless communication device which is applicable for plural communication systems and which makes a switch between plural send and receive signals by a switching circuit connected with a send-receive shared antenna to reduce harmonics radiated from the antenna during transmission. The invention also relates to a communication terminal using this front-end module.

In a terminal device of a wireless communication device as used in mobile communications such as a cellular phone or mobilephone, the sending and receiving systems share one antenna. In this case, a switching circuit is usually inserted between the antenna and the sending and receiving systems. During transmission, the antenna is switched to the transmitting system. During reception, the antenna is switched to the receiving system.

In the terminal device constructed in this way, when transmission is made, an RF send signal produced by the sending circuit of the transmitting system is propagated to the antenna through the switching circuit Then, the signal is radiated as an electromagnetic signal into the air by the antenna. During reception, an RF signal received by the antenna is supplied to the receiving circuit of the receiving system through the switching circuit.

The switching circuit uses a semiconductor device. Even where the sending circuit does not produce harmonics, if a large power such as more than 30 dBm is passed through the switching circuit, harmonics are produced due to nonlinearity of the switching circuit itself.

A configuration in which a filter (such as a low-pass filter for filtering out harmonics) is placed between the switching circuit and the antenna is conceivable as a method of suppressing the harmonics during transmission. However, this provides a loss to the receiving circuit and hence is disadvantageous. In addition, it is theoretically difficult to cope with plural communication systems. For example, there are the following problems. The second harmonic (1800 MHz) of GSM (900 MHz) is close to the fundamental wave of DCS (1750 MHz). The third harmonic (2400 MHz) of GSM (800 MHz) is close to the fundamental wave of PCS (1950 MHz).

Figure 5:
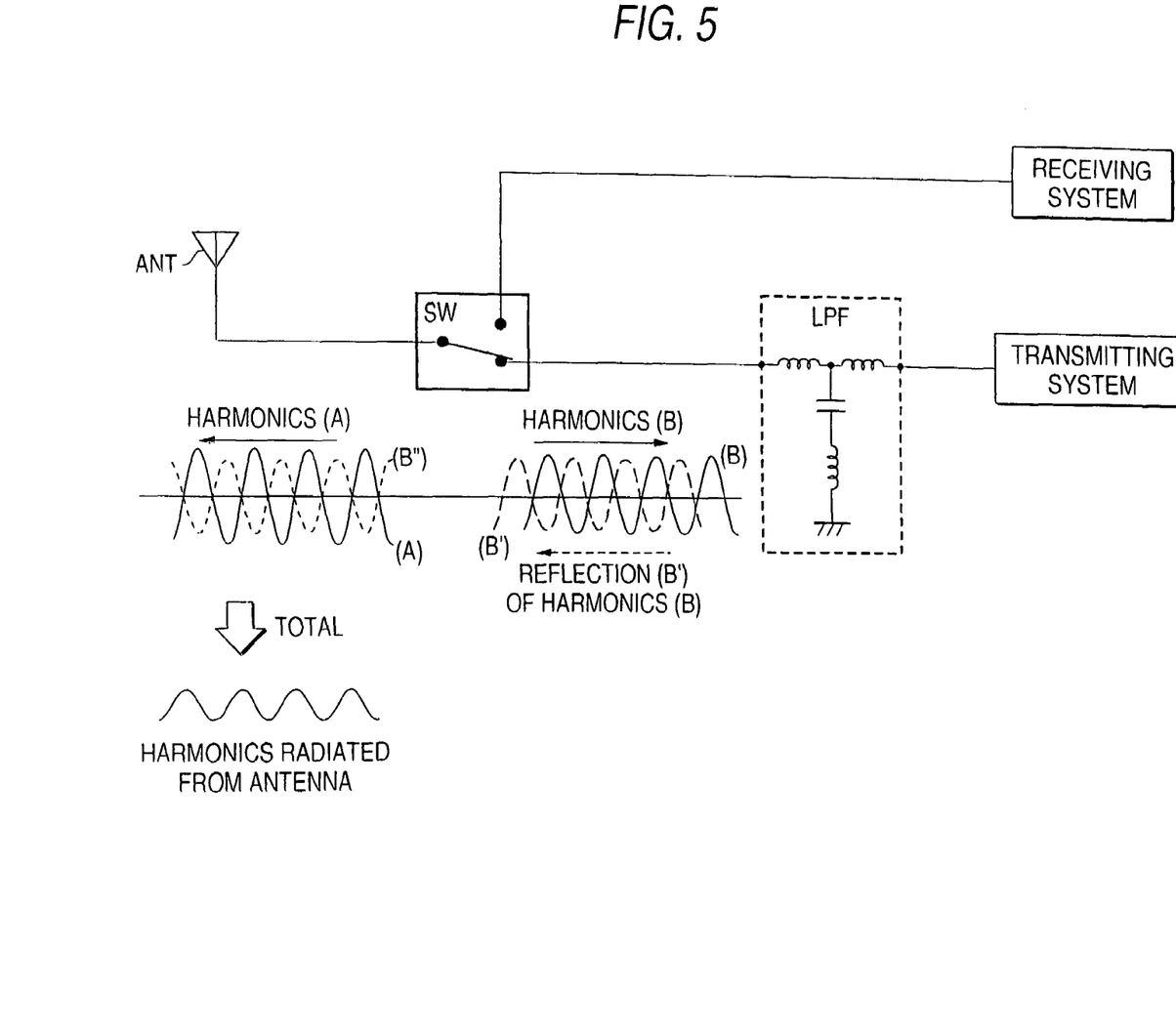
FIG. 5 is a conceptual view showing the conventional circuit.

Another method of suppressing harmonics during transmission uses a circuit proposed in Japanese Patent Publication JP-A-2001-86026. FIG. 5 is a conceptual view illustrating the manner-in which harmonics from a switching circuit SW are suppressed by a low-pass filter LPF positioned between the switching circuit SW and a transmitting system as shown in the Japanese publication. In FIG. 5, the switching circuit SW produces harmonics toward the antenna and toward the transmitting system at the same time. That is, harmonics (A) are produced toward the antenna. Harmonics (B) are produced toward the transmitting system. If the harmonics (B) traveling toward the transmitting system are well adjusted in phase and reflected by the low-pass filter LPF, the harmonics (B) cancel the harmonics (A) traveling toward the antenna. Thus, the harmonics radiated from the antenna ANT can be weakened.

The conventional circuit described in connection with FIG. 5 can weaken the harmonics on the antenna side to some extent but cannot completely cancel them out. For example, the harmonics suppression level requirement on mobile phones cannot be satisfied in some cases. It is considered that the cause is that when reflection waves (B') produced by reflecting harmonics (B) traveling toward the transmiting system by a low-pass filter LPF and harmonics (A) traveling toward the antenna are superimposed, they can be put 180° out of phase but cannot be made equal in amplitude, for the following reasons.

(1) Because of asymmetry of the switching circuit SW, the produced levels of harmonics are asymmetric between the input and output ends of the switching circuit SW.

(2) Because the low-pass filter LPF cannot be made loss less, the reflected waves (B') are smaller in amplitude than the harmonics (B).

(3) Because the reflected waves (B') attenuate further due to the loss in the switching circuit SW and become reflected waves (B"), when these waves are superimposed with the harmonics (A) in practice, the amplitude is reduced further.

SUMMARY OF THE INVENTION

In view of the foregoing, it is an object of the present invention to provide a small-sized, front-end module and communication terminal capable of suppressing harmonics to a sufficiently low level and for use in a wireless communication device such as a mobile phone.

To achieve the above-described object, according to first aspect of the present invention, a front-end module comprises a switching circuit for switching one antenna between a transmitting system and a receiving system, a power amplifier for power-amplifying a transmission signal, and a low-pass filter inserted between the switching circuit and the power amplifier. These switching circuit, power amplifier, and low-pass filter are unitary integrated. Harmonics produced from the switching circuit toward the power amplifier (referred to herein as the "first kind of harmonics") are reflected by the low-pass filter. Harmonics produced from the power amplifier toward the antenna are referred to herein as the "second kind of harmonics". Harmonics produced from the switching circuit toward the antenna are referred to herein as the "third kind of harmonics" and canceled by the reflected first kind of harmonics and the second kind of harmonics.

According to this front-end module, RF components subassembly ranging from the switching circuit to the low-pass filter and other RF components subassembly ranging from the low-pass filter to the power amplifier can be incorporated in or on a multilayer substrate and so it is easy to match the switching circuit and the low-pass filter. It is also easy to match the power amplifier and the low-pass filter. No matching circuit is required between the switching circuit and low-pass filter. Also, no matching circuit is required between the power amplifier and low-pass filter. Therefore, miniaturization can be achieved. Loss due to wiring between components can be reduced. Furthermore, where a multilayer substrate of high dielectric constant is used to integrate the components, the inductor and striplines can be shortened by the wavelength shortening effect. Therefore, the insertion loss can be reduced. Consequently, miniaturization and lower loss can be accomplished.

According to second aspect of the invention, the front-end module further includes the following features. When the first kind of harmonics is reflected by the low-pass filter, the phase and amplitude are adjusted by this low-pass filter. The phase and amplitude of the second kind of harmonics produced from the power amplifier toward the antenna are adjusted by a matching circuit included in the power amplifier.

According to third aspect of the invention, the front-end module further includes the following features. A matching circuit in the power amplifier acts also as the low-pass filter. When the first kind of harmonics is reflected, the phase and amplitude are adjusted by the matching circuit. The phase and amplitude of the second kind of harmonics produced from the power amplifier toward the antenna are adjusted also by the matching circuit.

According to fourth aspect of the invention, the front-end module further includes following feature. The switching circuit has a port connected with at least one receiving system and plural transmiting systems. Plural sets of power amplifiers and low-pass filters corresponding to the plural transmiting systems are integrated with the switching circuit.

According to fifth aspect of the invention, the front-end module further includes the following features. The switching circuit has a port connected with at least one receiving system and plural transmiting systems. Plural sets of power amplifiers and low-pass filters corresponding to the plural transmiting systems are integrated with the switching circuit. At least one diplexer corresponding to the at least one receiving system is integrated.

The diplexer forming an RF component subassembly can be incorporated in or on a multilayer substrate. Therefore, it is easy to match the switching circuit and diplexer. Hence, it is not necessary to provide a matching circuit between the switching circuit and diplexer. Therefore, miniaturization can be achieved. Loss due to wiring between components can be reduced. Furthermore, where a multilayer substrate of high dielectric constant is used to integrate the components, the inductor and striplines can be shortened by the wavelength shortening effect. Therefore, the insertion loss can be reduced. Consequently, miniaturization and lower loss can be accomplished.

Where the isolation between the sending circuit side and receiving circuit side of the switching circuit is not sufficient, the impedance on the receiving circuit side affects the sending circuit side. The impedance on the sending circuit side also affects the receiving circuit side. By the integrated configuration as described above, the matching on the sending circuit side can be set by taking account of the effects of the impedance on the receiving circuit side. The matching on the receiving circuit side can be set by taking account of the effects of the impedance on the sending circuit side. In consequence, the characteristics are improved further.

According to sixth aspect of the invention, the front-end module further includes the following features. The switching circuit has a port connected with at least one receiving system and plural transmiting systems. Plural sets of power amplifiers and low-pass filters corresponding to the plural transmiting systems are integrated with the switching circuit. At least one SAW filter corresponding to the at least one receiving system is integrated.

The switching circuit and SAW filter forming an RF component subassembly can be incorporated in or on a multilayer substrate and so it is easy to match the switching circuit and the SAW filter. It is necessary to provide no matching circuit between the switching circuit and SAW filter. Therefore, miniaturization can be achieved. Loss due to wiring between components can be reduced. Furthermore, where a multilayer substrate of high dielectric constant is used to integrate the components, the inductor and striplines can be shortened by the wavelength shortening effect. Therefore, the insertion loss can be reduced. Consequently, miniaturization and lower loss can be accomplished. By the integrated configuration as in the sixth embodiment, the matching on the sending circuit side can be set by taking account of the effects of the impedance on the receiving circuit side. The matching on the receiving circuit side can be set by taking account of the effects of the impedance on the sending circuit side. In consequence, the characteristics are improved further.

According to the seventh aspect of the invention, in the front-end module, an APC circuit corresponding to the plural power amplifiers is integrated with the switching circuit.

According to the eighth aspect of the invention, a communication terminal is fitted with the above-mentioned front-end module The present invention provides a configuration in which at least a switching circuit for switching one antenna between a transmiting system and a receiving system, a power amplifier for power-amplifying a transmission signal, and a low-pass filter inserted between the switching circuit and power amplifier are unitary integrated. A first kind of harmonics produced from the switching circuit toward the power amplifier is reflected by the low-pass filter. A second kind of harmonics is produced from the power amplifier toward the antenna. A third kind of harmonics produced from the switching circuit toward the antenna is canceled by the reflected first kind of harmonics and the second kind of harmonics. Thus, harmonics radiated from the antenna can be suppressed sufficiently (e.g., to below −30 dBm) Furthermore, a simple switching circuit using GaAs transistors or the like can be adopted. Consequently, miniaturization can be accomplished. Especially, where the number of ports of the switching circuit is increased, generation of harmonics due to nonlinearity becomes conspicuous. Therefore, as the number of receiving and transmitting systems is increased, the harmonics can be suppressed more efficiently.

Other objects and novel features of the invention will be made clear in embodiments described later.

BRIEF DESCRIPTION OF THE DRAWINGS

FIGS. 7A to 7C show graphs illustrating the relation between the harmonics level at the antenna side and phase, depicting examples of verification of the harmonics suppression effects by simulations in various cases: in which

DESCRIPTION OF THE PREFERRED EMBODIMENTS

As the best modes for implementing the present invention, embodiments of the front-end module according to the present invention are hereinafter described with reference to the drawings.

Figure 1:
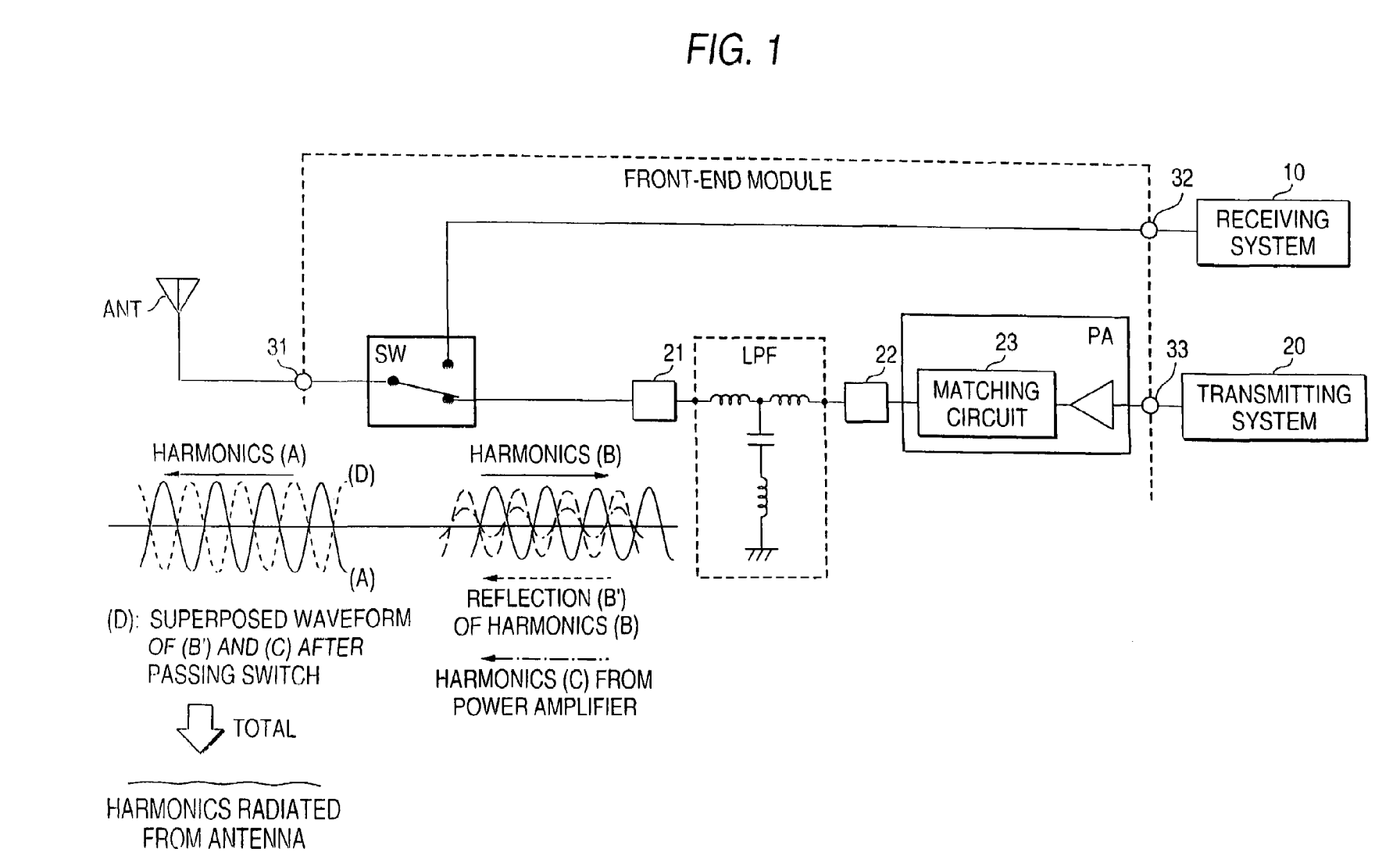
FIG. 1 is a conceptual diagram showing a first embodiment of a front-end module and communication terminal according to the present invention.

FIG. 1 is a conceptual view showing a first embodiment of a front-end module (within the dotted line) and communication terminal using it. In this figure, one antenna ANT is switched by a switching circuit SW, whereby the antenna is shared between a receiving system 10 and a transmiting system 20. A low-pass filter LPF is inserted between a power amplifier PA and the switching circuit SW, the amplifier PA power-amplifying a transmission signal from the transmiting system 20 (in this case, a transmission signal-generating means for producing a transmission signal before being power-amplified by the power amplifier PA). A phase shifter 21 acting as a phase-adjusting means is inserted between the switching circuit SW and the low-pass filter LPF. Another phase shifter 22 acting as a phase-adjusting means is inserted between the low-pass filter LPF and the power amplifier PA. The switching circuit SW, low-pass filter LPF, power amplifier PA, and phase shifters 21, 22 are integrated as the front-end module and installed on the same multilayer printed circuit board, for example. Their mutual positional relations and the lengths of connecting lines are stipulated. A common port of the switching circuit SW is connected with an antenna terminal 31 for connecting the antenna ANT. The switching circuit SW has two switching ports (input/output ends) one of which is connected with a receiver terminal 32 for connection of the receiving system. The other is connected with the output side of the power amplifier PA via the phase shifter 21, low-pass filter LPF, and phase shifter 22. The input side of the power amplifier PA is connected with a sender terminal 33 for receiving a transmission signal from the transmiting system 20. A matching circuit 23 for impedance matching with the antenna side is incorporated on the output side of the power amplifier PA.

In the conceptual view of FIG. 1, when the antenna ANT is connected with the receiving system 10 by the switching action of the switching circuit SW, nonlinearity of the switching circuit SW presents no problems. The receiving system 10 performs a receiving operation.

When the antenna ANT is connected with the transmiting system 20 by the switching action of the switching circuit SW, harmonics arising from the nonlinearity of the switching circuit SW presents a problem. Harmonics (B) are produced from the switching circuit SW toward the power amplifier PA and reflected by the low-pass filter LPF, resulting in reflected harmonics (B'). Harmonics (C) are produced from the power amplifier PA toward the antenna ANT. In the present embodiment, this problem is solved by canceling harmonics (A) produced from the switching circuit SW toward the antenna by the reflected harmonics (B') and the harmonics (C). That is, the reflected harmonics (B') and the harmonics (C) from the power amplifier PA pass through the switching circuit SW. If the superimposed waveforms (D) from this switching circuit have the same amplitude as the harmonics (A) produced from the switching circuit SW toward the antenna and are 180° out of phase with the harmonics (A), it follows that the harmonics radiated from the antenna ANT can be completely suppressed. The phase of the harmonics (C) can be adjusted by the phase shifter 22. The phase of the reflected harmonics (B') can be adjusted by the phase shifter 21, as well as the phase of the harmonics (C). Furthermore, the amplitude of the harmonics (C) can be adjusted by the circuit constants of the matching circuit 23 and low-pass filter LPF. The amplitude of the reflected harmonics (B') can be adjusted by the circuit constant of the low-pass filter LPF. Although the harmonics (C) are attenuated when they pass through the low-pass filter LPF, the amplitude necessary to suppress the harmonics on the antenna side is at a quite a low level. The quite low level produced by the attenuation caused by the low-pass filter LPF suffices.

In the configuration of FIG. 1, it is required that the power amplifier PA be integrated with at least the switching circuit SW and low-pass filter LPF. If the power amplifier PA forms a separate module, the phase varies due to variations in line length between different modules. This makes it difficult to suppress harmonics on the antenna side.

In the conceptual view of FIG. 1, it has been assumed, for ease of illustration, that the phase shifters 21 and 22 are used to adjust the phases of the reflected harmonics (B') and the harmonics (C) from the power amplifier PA. In practice, the amplitudes and phases of the harmonics including the reflected harmonics can be appropriately set by the circuit constant of the matching circuit 23 incorporated in the power amplifier PA or low-pass filter LPF. At this time, the phase shifters 21 and 22 can be omitted.

Figure 6:
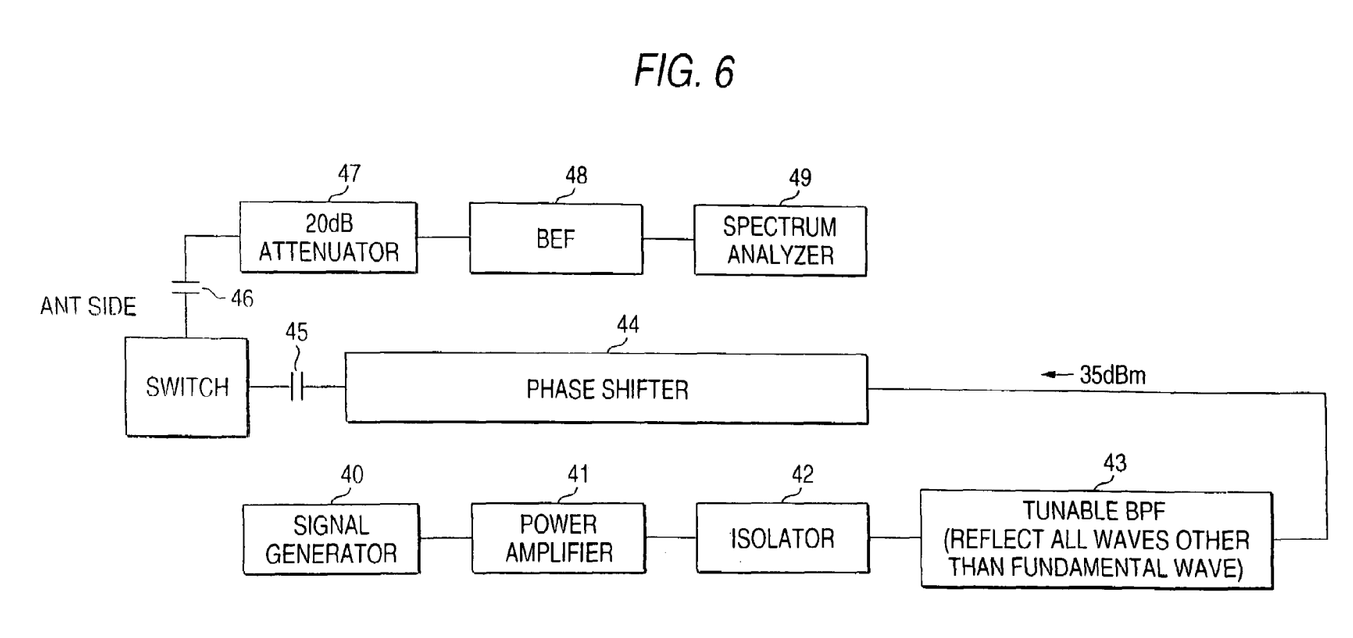
FIG. 6 is a block diagram illustrating measurement of the level of harmonics produced by a switching circuit.

FIG. 6 is a block diagram illustrating measurement of the harmonics level produced by the switching circuit SW. An RF signal produced by a signal generator 40 is power-amplified by a power amplifier 41 and applied to the switching circuit SW through an isolator 42, a tunable bandpass filter 43, a phase shifter 44, and a DC blocking capacitor 45. It is assumed that the fundamental level is 35 dBm. This corresponds to the conventional circuit of FIG. 5 in which the power-amplified transmission signal is applied to the switching circuit SW. The tunable bandpass filter 43 totally reflects all waves other than the fundamental wave (signal frequency from the signal generator). The operation for reflecting the harmonics from the switching circuit SW corresponds to the low-pass filter LPF in the conventional circuit of FIG. 5.

The harmonics arising from the nonlinearity of the switching circuit SW are passed through a DC blocking capacitor 46 and a 20-dB attenuator 47. The fundamental component is removed by a band eliminate filter (BEF) 48, and then a measurement is made by a spectrum analyzer 49. The level of the harmonics radiated from the antenna ANT can be measured in the conventional circuit of FIG. 5 from measurement values of harmonics obtained by the spectrum analyzer 49.

Where the harmonics produced by the switching circuit SW to the antenna side are evaluated in this FIG. 6, it can be relatively easily seen that the RF power can be varied by varying the phase by adjusting the phase shifter 44, and the variation can be measured. For example, it is assumed that the RF power assumes a best value of −30 dBm and a worst value of −20 dBm. It can be understood that with contrived adjustment of the amplitude and phase of the harmonics reflected by the low-pass filter LPF in the conventional circuit of FIG. 5, approximately −30 dBm can be attained at best. It is considered that in FIG. 6, this value corresponds to the superimposition of the harmonics first traveling toward the antenna and the harmonics which are reflected back after leaving for the tunable bandpass filter. The harmonics not yet superimposed are simply calculated. The harmonics first traveling toward the antenna can be calculated to be about −22.6 dBm. The reflected harmonics can be calculated to be approximately −23.5 dBm. Because of this imbalance, the countermeasure taken only in the low-pass filter LPF as in the conventional circuit of FIG. 5 has a limitation. The harmonics remaining on the antenna side cannot be canceled out unless a new harmonic signal is introduced and superimposed.

As shown in the first embodiment of FIG. 1, the components up to the power amplifier PA for power-amplifying the transmission signal from the transmiting system 20 are integrated with the switching circuit SW. The harmonics produced by the power amplifier PA are passed through the low-pass filter LPF and intentionally leaked, and the phase and amplitude are optimized. Thus, the harmonics on the antenna side can be almost completely canceled out.

Figure 7A:
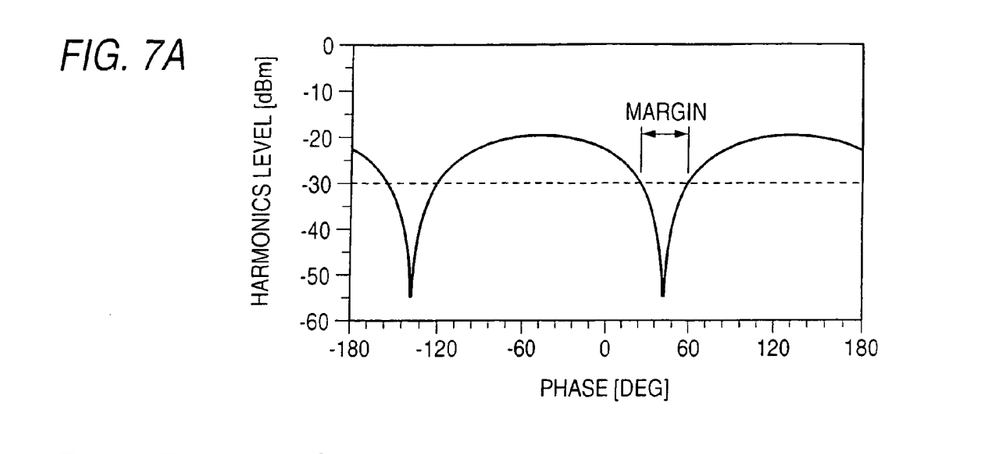
FIG. 7A shows a case where the harmonics power produced from the switching circuit toward the antenna and the harmonics power produced from the switching circuit-toward the power amplifier are at the same level.
Figure 7B:
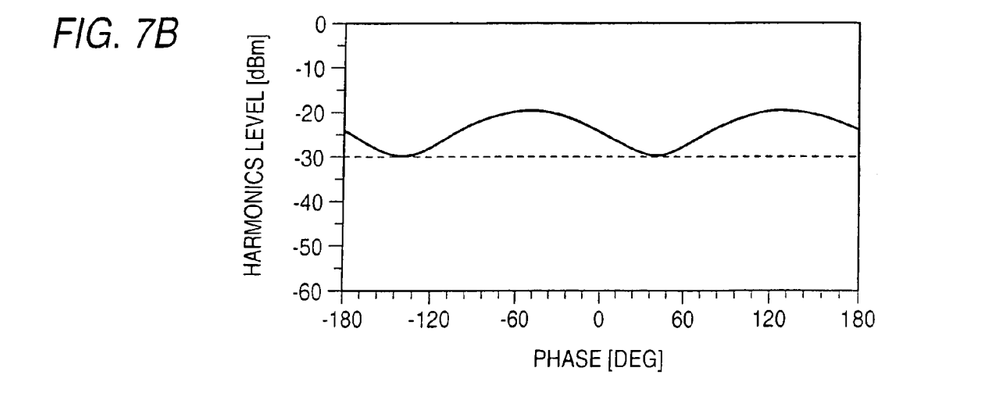
FIG. 7B shows a case where the harmonics power produced from the switching circuit toward the antenna is greater than the harmonics power produced from the switching circuit toward the power amplifier.
Figure 7C:
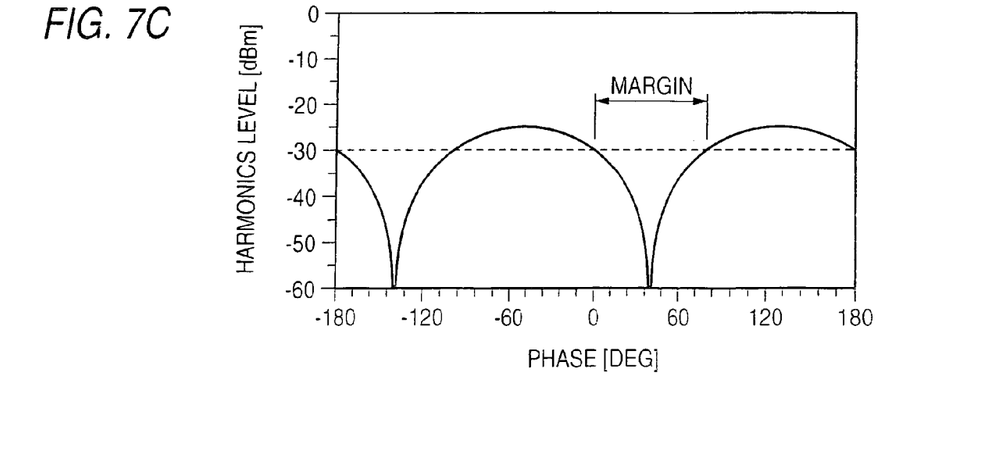
FIG. 7C shows a case where harmonics are injected from the power amplifier when the harmonics power produced from the switching circuit toward the antenna is greater than the harmonics power produced from the switching circuit toward the power amplifier(in the case of the first embodiment of the invention).

Examples of tentative calculations of the effects obtained by simulational calculations are given in FIGS. 7A to 7C, where FIG. 7A indicates a case in which the harmonics power produced from the switching circuit toward the antenna and the harmonics power produced toward the power amplifier are at the same level. In this case, if the harmonics are totally reflected by the low-pass filter LPF, and if the phase of the reflected harmonics is well selected or adjusted, the harmonics can be canceled by the harmonics appearing on the antenna side. Hence, the harmonics radiated from the antenna can be suppressed. There is a phase range in which the harmonics can be suppressed to below −30 dBm. However, in almost all switching circuits, the harmonics power produced toward the antenna and the harmonics power produced toward the power amplifier are not at the same level. Therefore, a problem as described below in connection with FIG. 7B occurs.

FIG. 7B shows a case in which the harmonics power produced toward the antenna from the switching circuit is greater than the harmonics power produced toward the power amplifier. In this case, the harmonics on the antenna side cannot be suppressed sufficiently only if the low-pass filter LPF is designed ingeniously. There is not any phase range in which the harmonics can be suppressed to below −30 dBm.

FIG. 7C shows a case in which the harmonics power produced toward the antenna from the switching circuit is greater than the harmonics power produced toward the power amplifier and, at the same time, harmonics are injected from the power amplifier (in the case of the first embodiment). When harmonics whose amplitude and phase have been adjusted are injected from the power amplifier, the harmonics on the antenna side can be suppressed to a great extent, i.e., almost completely. Furthermore, the phase margin is increased. That is, the phase range in which harmonics can be suppressed to below −30 dBm is widened.

Figure 2:
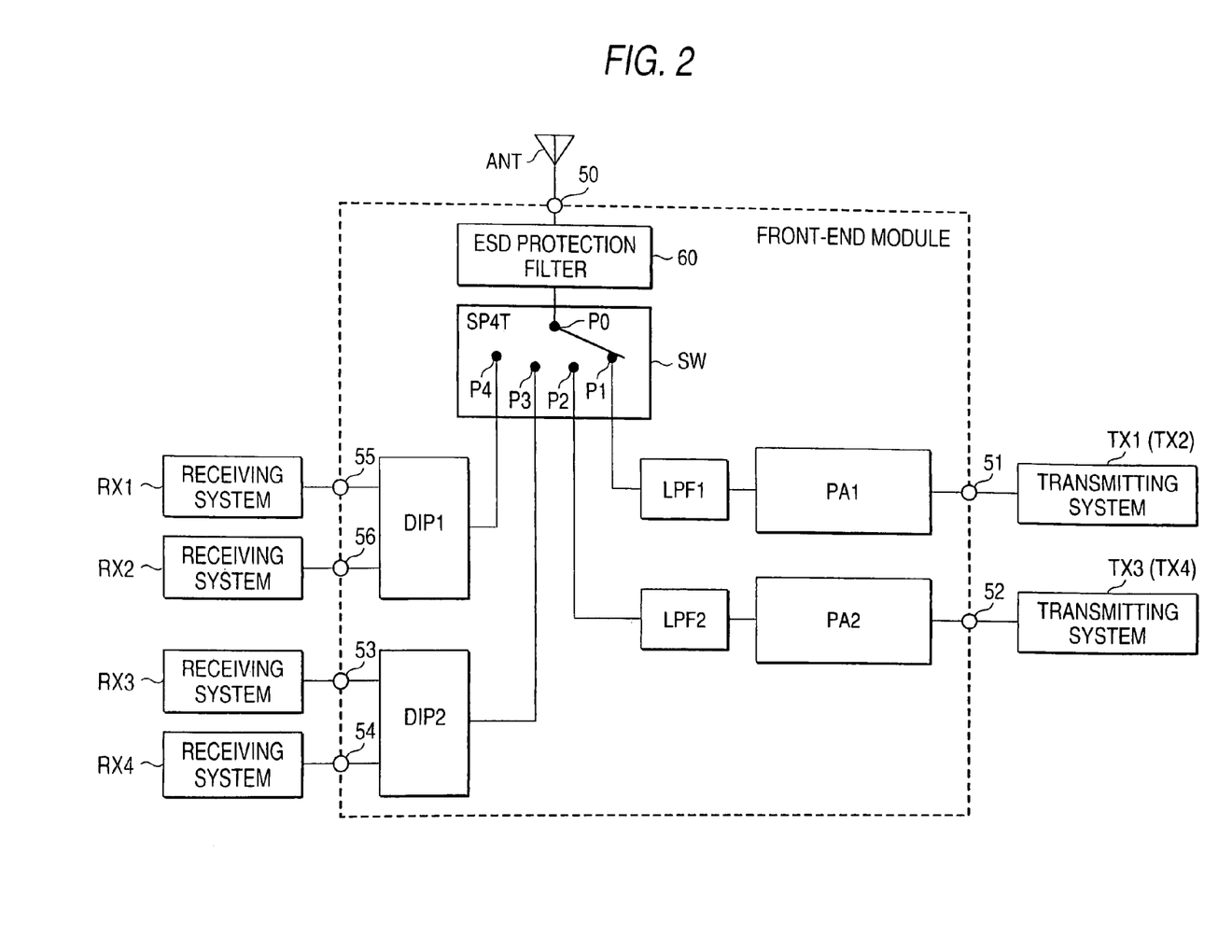
FIG. 2 is a block diagram showing a second embodiment of the invention.

FIG. 2 shows a second embodiment of the front-end module and communication terminal according to the invention, and depicts a more practical circuit configuration capable of coping with plural receiving systems and plural transmiting systems. In this FIG. 2, the front-end module consists of a switching circuit SW, low-pass filters LPF1, LPF2, power amplifiers PA1, PA2, diplexers (band separating circuits) DIP1, DIP2, and an ESD protection filter 60 all of which are integrated on a common substrate.

Figure 3:
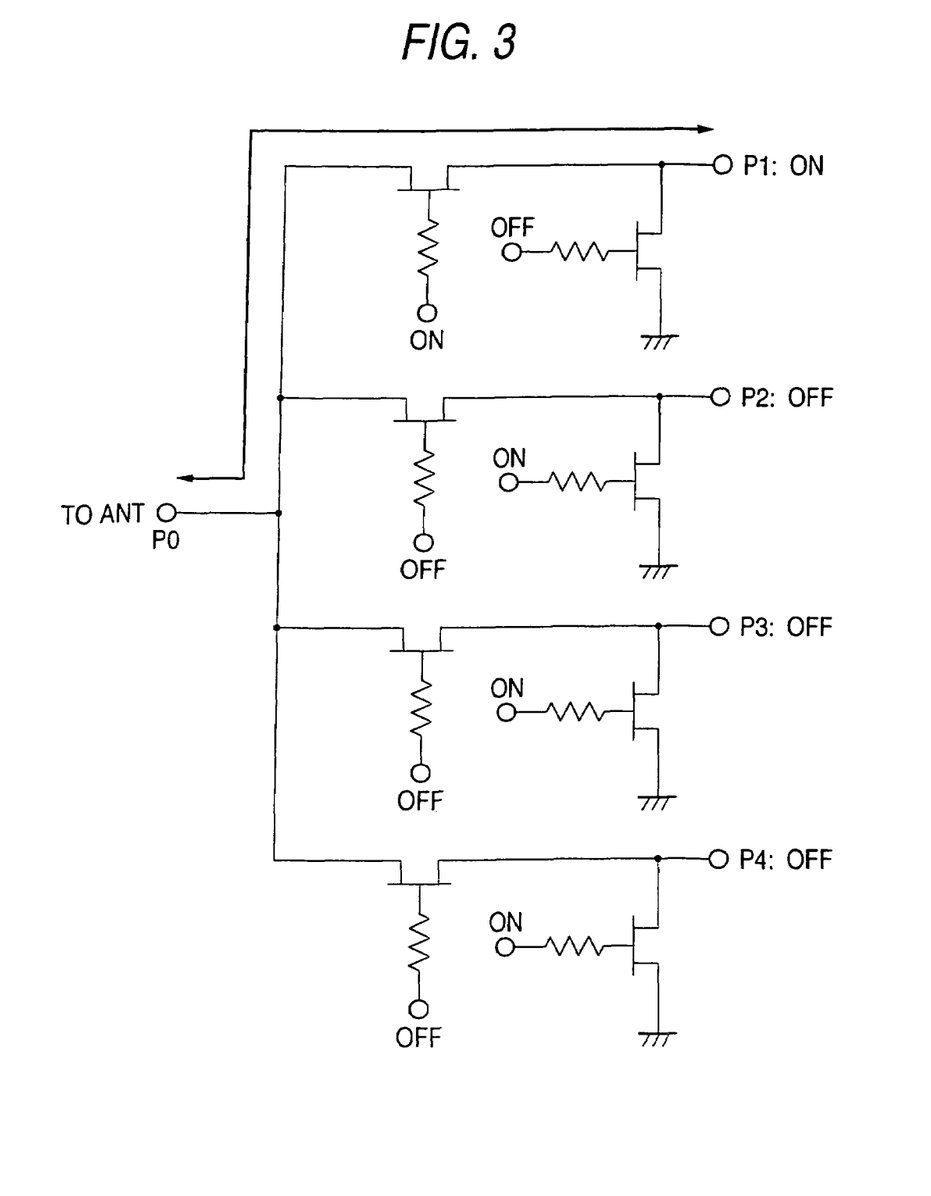
FIG. 3 is a circuit diagram of one example of switching circuit used in the second embodiment of the invention.

This switching circuit SW is of SP4T (single-pole four throw) type in which plural GaAs transistors are combined as shown in FIG. 3. The switching circuit SW has one common port P0 connected with the antenna side and four selector ports P1–P4 selectively electrically connected with the common port P0. In the case of FIG. 3, the common port P0 and port P1 are electrically connected (ON). The other selector ports are not connected (OFF). It is considered that in this switching circuit SW of FIG. 3, transistors in OFF state especially produce harmonics. As the number of switched ports is increased, a greater level of harmonics tends to be produced.

The common port P0 in the switching circuit SW of FIG. 3 is connected with an antenna terminal 50 for connecting the antenna ANT, via the ESD protection filter 60, as shown in FIG. 2. The ESD protection filter 60 protects the transistors from static electricity because the transistors possessed by the switching circuit SW are vulnerable to static electricity.

The port P1 of the switching circuit SW is connected with the output side of the power amplifier PA1 through the low-pass filter LPF1. The input side of the power amplifier PA1 is connected with a sending terminal 51 that receives transmission signals from transmiting systems TX1 and TX2. Similarly, the port P2 of the switching circuit SW is connected with the output side of the power amplifier PA2 via the low-pass filter LPF2. The input side of the power amplifier PA2 is connected with a sending terminal 52 that receives transmission signals from transmiting systems TX3 and TX4.

The port P3 of the switching circuit SW is branched via the diplexer (band separating circuit) DIP2 and connected with receiving terminals 53 and 54. The port P4 is branched via the diplexer DIP1 and connected with receiving terminals 55 and 56.

Receiving systems RX1 and RX2 are connected with the receiving terminals 55 and 56, respectively. Receiving systems RX3 and RX4 are connected with the receiving terminals 53 and 54, respectively. For example, the transmiting systems TX1 and TX2 correspond to GSM and A-GSM. TX3 and TX4 correspond to DCS and PCS. The receiving systems RX1 and RX2 correspond to GSM and DCS. RX3 and RX4 correspond to A-GSM and PCS.

In FIG. 2, when the switching circuit SW selects the port P1, transmission is made using the transmiting system TX1 or TX2. When the port P2 is selected, transmission is made using the transmiting system TX3 or TX4. When the port P3 is selected, reception is performed using the receiving system RX3 or RX4. When the port P4 is selected, reception is made using the receiving system RX1 or RX2.

Also, in this second embodiment, in the system of the switching circuit SW, low-pass filter LPF1, and power amplifier PA1, the circuit constants of the matching circuits included in the low-pass filter LPF1 and power amplifier PA1 are so set that the harmonics produced from the switching circuit SW toward the antenna are canceled by reflected harmonics and by harmonics produced from the power amplifier PA1 toward the antenna ANT. The reflected harmonics occur when harmonics produced from the switching circuit SW toward the power amplifier PA1 are reflected by the low-pass filter LPF1. That is, when the harmonics produced from the switching circuit SW toward the power amplifier PA1 are reflected by the low-pass filter LPF1, the phase and amplitude are adjusted by this filter LPF1. The phase and amplitude of the harmonics produced from the power amplifier PA1 toward the antenna ANT are adjusted by the matching circuit included in the power amplifier PA1. Alternatively, the matching circuit maybe made to act also as the low-pass filter LPF1 (i.e., also having the function of a low-pass filter), and the low-pass filter LPF1 may be omitted. The system of the switching circuit SW, low-pass filter LPF2, and power amplifier PA2 can similarly suppress harmonics radiated from the antenna ANT sufficiently.

Figure 4:
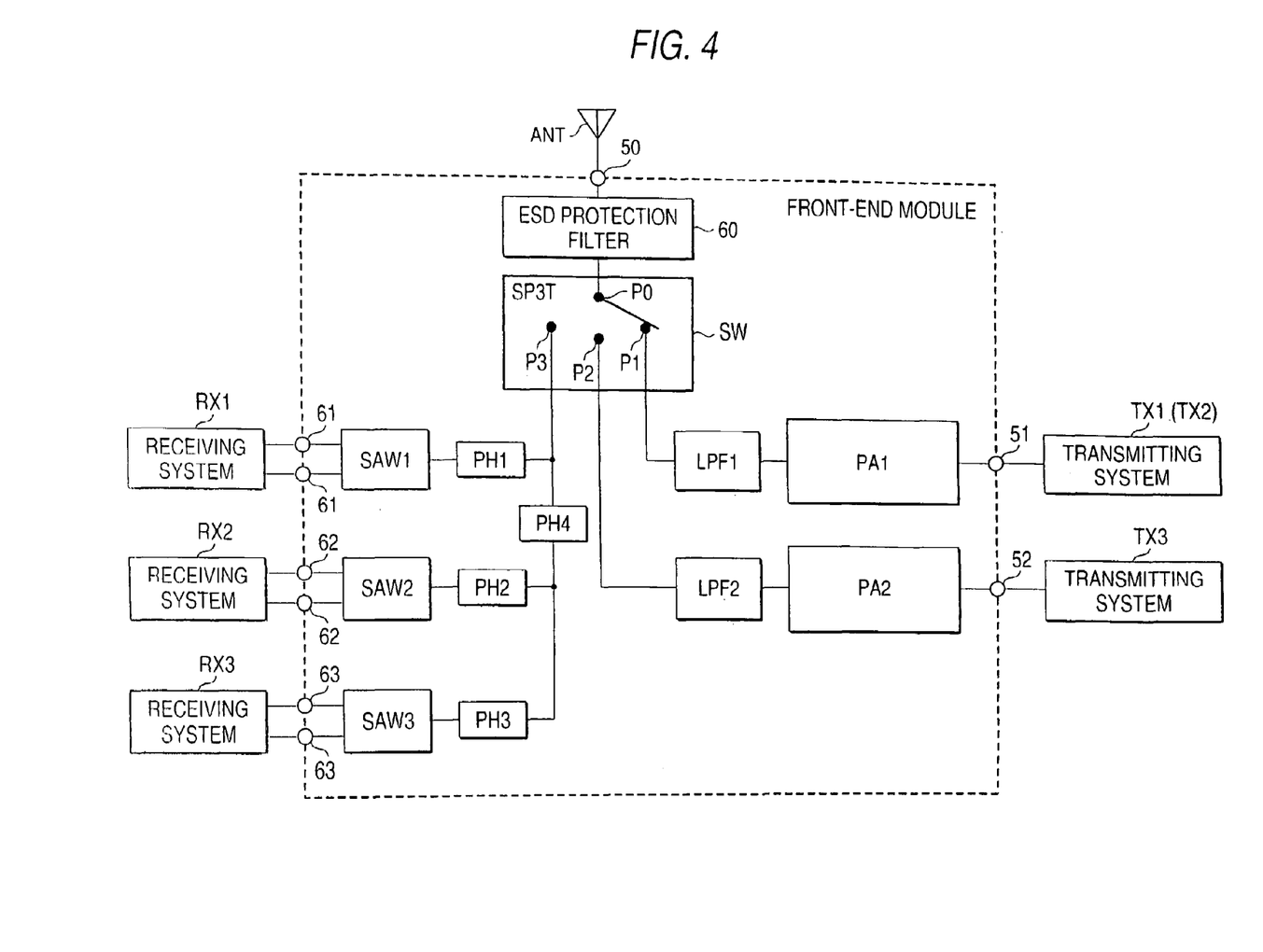
FIG. 4 is a block diagram showing a third embodiment of the invention.

FIG. 4 shows a third embodiment of the invention. In this embodiment, a more practical circuit configuration using SAW (surface acoustic wave) filters having the function of a bandpass filter instead of a diplexer is shown. This circuit configuration can cope with plural receiving systems and plural transmiting systems. In this FIG. 4, a front-end module consists of a switching circuit SW, low-pass filters LPF1, LPF2, power amplifiers PA1, PA2, SAW filters SAW1, SAW2, SAW3, phase shift circuits PH1, PH2, PH3, PH4 for phase adjustment, and an ESD protection filter 60 all of which are integrated on a common substrate.

The switching circuit SW is of SP3T (single-pole three throw) type in which plural GaAs transistors are combined. The switching circuit has one common port P0 connected with the antenna side and three selector ports P1 to P3 selectively electrically connected with the common port P0. Receiving systems RX1, RX2, and RX3 are connected with the SAW filters SAW1, SAW2, and SAW 3, respectively, via terminals 61, 62, and 63, respectively. The other structures are similar to their respective counterparts of the second embodiment described above. Identical or corresponding parts are indicated by identical numerals and their description is omitted.

The functions of the third embodiment for suppressing harmonics are implemented in the same way as in the second embodiment.

Figure 8:
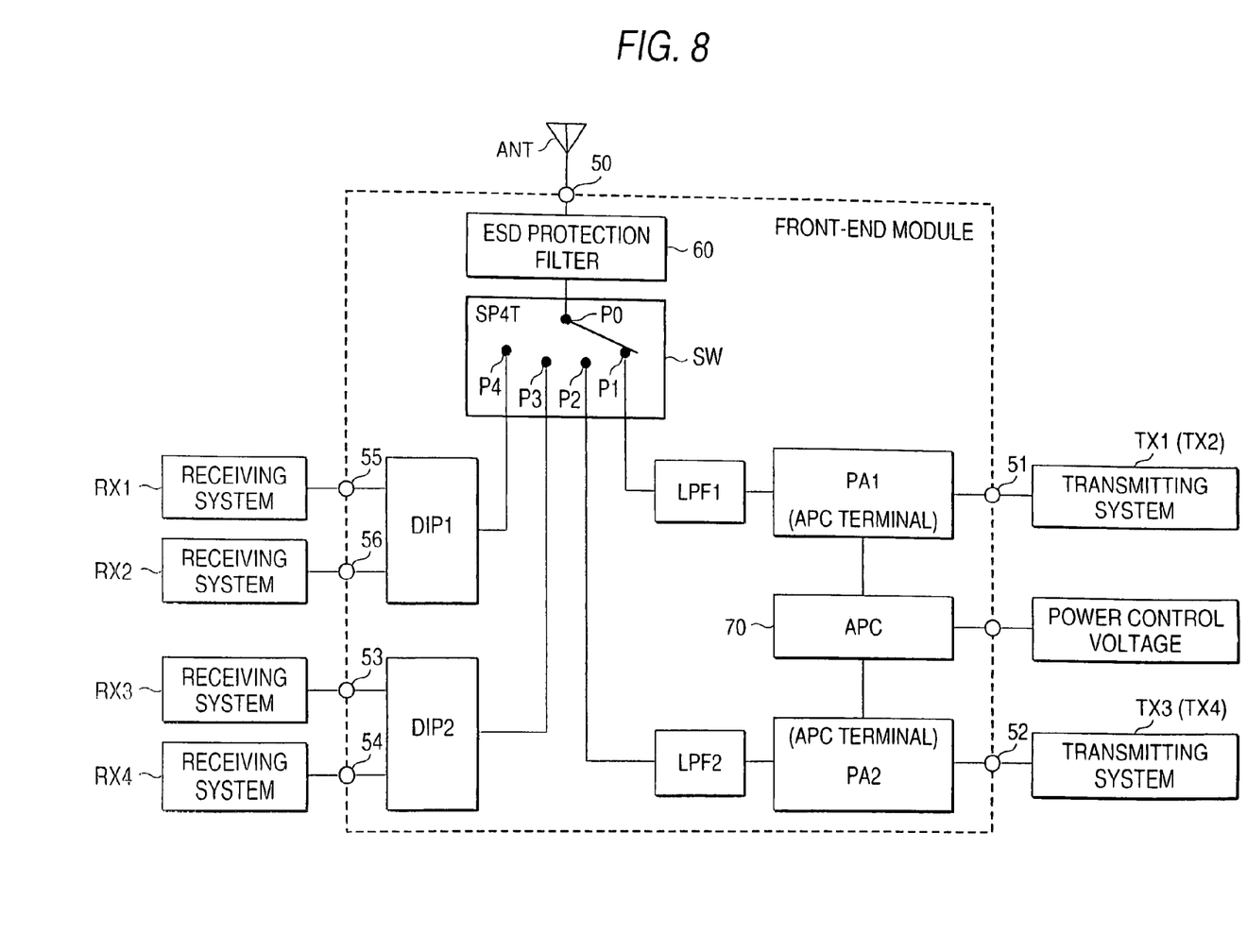
FIG. 8 is a block diagram showing a fourth embodiment of the invention.

FIG. 8 shows a fourth embodiment of the front-end module and communication terminal according to the invention. This has the configuration of the second embodiment shown in FIG. 2. In addition, an APC (automatic power control) circuit 70 is also integrated. That is, in FIG. 8, the front-end module consists of a switching circuit SW, low-pass filters LPF1, LPF2, power amplifiers PA1, PA2, the APC circuit 70, diplexers (band separating circuits) DIP1, DIP2, and an ESD protection filter 60 all of which are integrated on a common substrate. The APC circuit 70, diplexers DIP1, DIP2, and ESD protection filter 60 correspond to the power amplifiers.

The APC circuit 70 detects the output powers from the power amplifiers PA1 and PA2 and controls the voltages at the APC terminals of the power amplifiers PA1 and PA2 based on the detected powers to thereby control the powers produced from the power amplifiers PA1 and PA2 to a desired power value. A power control voltage applied to the APC circuit 70 is a control voltage for setting the output powers from the power amplifiers PA1 and PA2 to a desired value via the APC circuit 70.

The following methods are available to detect the output powers from the power amplifiers PA1 and PA2.

(1) A coupler is inserted between the power amplifier PA1 and low-pass filter LPF1. Another coupler is inserted between the power amplifier PA2 and low-pass filter LPF2. Slight RF powers are taken and detected by the detection circuit within the APC circuit 70.

(2) Currents flowing into the power terminals of the power amplifiers PA1 and PA2 are detected as voltages by inserting minute resistors. This is used instead of measurement of powers. This method makes use of the fact that there is a correlation between the output power and the current flowing into the power terminal.

With any method, quite low voltages are treated. Therefore, if the routed cables extending from the power amplifiers PA1 and PA2 to the APC circuit 70 are long, the power control becomes unstable. As a result, the output voltages from the power amplifiers vary.

The power control is stabilized by integrating the APC circuit 70 with the substrate on which the switching circuit SW and power amplifiers PA1, PA2 are installed as in this fourth embodiment.

In the first embodiment of the invention, controlling the power and phase of the harmonics produced from the power amplifier is important to suppress harmonics in the front-end module as mentioned previously. If a coupler is inserted between the output terminal of the power amplifier and low-pass filter, the impedance at the harmonics is affected by an external circuit connected with the coupler. It is possible that only weak coupling occurs for the fundamental wave but stronger coupling occurs for the frequencies of higher harmonics such as the second and third harmonics. Consequently, as in the fourth embodiment, where the APC circuit is integrated with the switching circuit and power amplifiers, harmonics can be suppressed more stably.

The fourth embodiment is similar to the above-described second embodiment in terms of the other structures, operation, and advantages.

Figure 9:
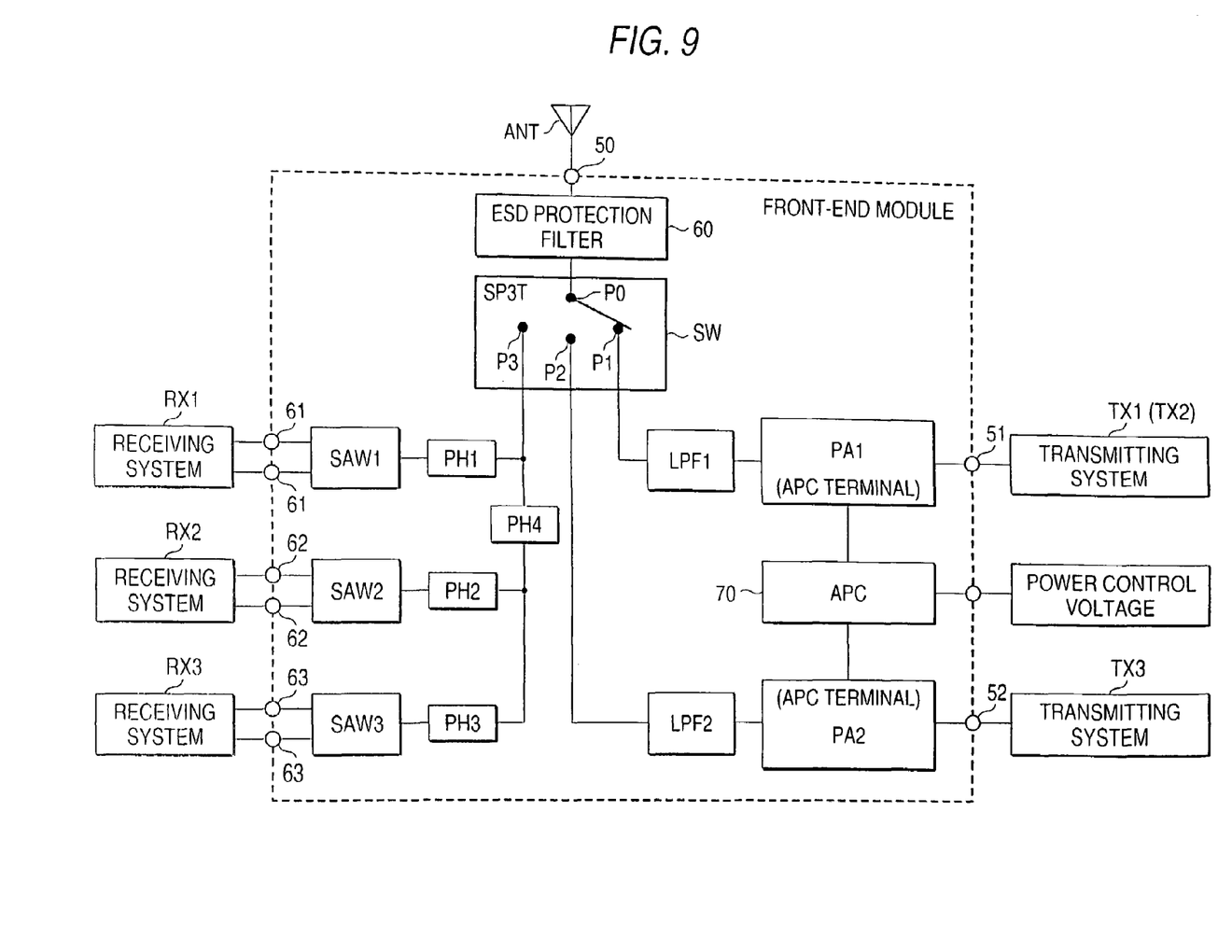
FIG. 9 is a block diagram showing a fifth embodiment of the invention.

FIG. 9 shows a fifth embodiment of the invention. This has the configuration of the third embodiment shown in FIG. 4. In addition, an APC (automatic power control) circuit 70 is also integrated. That is, in FIG. 9, the front-end module has the switching circuit SW, low-pass filters LPF1, LPF2, power amplifiers PA1, PA2, APC circuit 70, SAW filters SAW1, SAW2, SAW3, phase shifting circuits PH1, PH2, PH3, PH4 for phase adjustment, and ESD protection filter 60 all of which are integrated on a common substrate. The APC circuit 70, SAW filters SAW1, SAW2, SAW3, phase shifting circuits PH1, PH2, PH3, PH4, and ESD protection filter 60 correspond to the power amplifiers.

In the case of the fifth embodiment, the APC circuit 70 is integrated. As a result, this fifth embodiment can yield the same advantages as the above-described fourth embodiment.

The fifth embodiment is similar to the above-described third embodiment in terms of the other structures, operation, and advantages.

While embodiments of the invention have been described so far, the invention is not limited thereto. It will be obvious for those skilled in the art that various changes and modifications are possible within the scope delineated by the appended claims.

What is claimed is:

1. A front-end module comprising:
   a switching circuit for switching one antenna between a transmiting system and a receiving system;
   a power-amplifier for power-amplifying a transmission signal; and
   a low-pass filter inserted between the switching circuit and the power amplifier,
   wherein said switching circuit, power amplifier, and low-pass filter being unitary integrated, and
   wherein a first kind of harmonics produced from said switching circuit toward said power amplifier is reflected by said low-pass filter, a second kind of harmonics is produced from said power amplifier toward the antenna, and a third kind of harmonics produced from said switching circuit toward said antenna is canceled by said reflected first kind of harmonics and said second kind of harmonics.

2. The front-end module set forth in claim 1, wherein when said first kind of harmonics are reflected by said low-pass filter, the phase and amplitude are adjusted by said low-pass filter, and wherein the phase and amplitude of said second kind of harmonics produced from said power amplifier toward said antenna are adjusted by a matching circuit included in said power amplifier.

3. The front-end module set forth in claim 1, wherein a matching circuit in said power amplifier acts also as said low-pass filter, and wherein when said first kind of harmonics is reflected, the phase and amplitude are adjusted by said matching circuit, as well as the phase and amplitude of said second kind of harmonics produced from said power amplifier toward said antenna.

4. The front-end module set forth in any one of claims 1 to 3, wherein said switching circuit has a port connected with at least one receiving system and plural transmiting systems, and wherein plural sets of power amplifiers and low-pass filters corresponding to said plural transmiting systems are integrated with said switching circuit.

5. The front-end module set forth in any one of claims 1 to 3, wherein said switching circuit has a port connected with at least one receiving system and plural transmiting systems, plural sets of power amplifiers and low-pass filters corresponding to said plural transmiting systems are integrated with said switching circuit, and at least one diplexer corresponding to said at least one receiving system is integrated.

6. The front-end module set forth in any one of claims 1 to 3, wherein said switching circuit has a port connected with at least one receiving system and plural transmiting systems, plural sets of power amplifiers and low-pass filters corresponding to said plural transmiting systems are integrated with said switching circuit, and at least one SAW filter corresponding to said at least one receiving system is integrated.

7. The front-end module set forth in any one of claims 1 to 3, wherein an auto power control (APC) circuit corresponding to said power amplifier or amplifiers is integrated with said switching circuit.

8. A communication terminal comprising a front-end module including:

a switching circuit for switching one antenna between a transmiting system and a receiving system;

a power amplifier for power-amplifying a transmission signal; and a low-pass filter inserted between the switching circuit and the power amplifier, wherein said switching circuit, power amplifier, and low-pass filter being unitary integrated, and wherein a first kind of harmonics produced from said switching circuit toward said power amplifier is reflected by said low-pass filter, a second kind of harmonics is produced from said power amplifier toward the antenna, and a third kind of harmonics produced from said switching circuit toward said antenna is canceled by said reflected first kind of harmonics and said second kind of harmonics.

9. The communication terminal set forth in claim 8, wherein when said first kind of harmonics are reflected by said low-pass filter, the phase and amplitude are adjusted by said low-pass filter, and wherein the phase and amplitude of said second kind of harmonics produced from said power amplifier toward said antenna are adjusted by a matching circuit included in said power amplifier.

10. The communication terminal set forth in claim 8, wherein a matching circuit in said power amplifier acts also as said low-pass filter, and wherein when said first kind of harmonics is reflected, the phase and amplitude are adjusted by said matching circuit, as well as the phase and amplitude of said second kind of harmonics produced from said power amplifier toward said antenna.

* * * * *